United States Patent
Mao

(10) Patent No.: US 7,145,608 B2
(45) Date of Patent: Dec. 5, 2006

(54) METHOD OF USING LOCALITY STATISTICS CHARACTERISTIC TO ENHANCE GAMMA CORRECTIONS

(75) Inventor: Ching-Lung Mao, Taipei (TW)

(73) Assignee: Primax Electronics Ltd., Taipei (TW)

( * ) Notice: Subject to any disclaimer, the term of this patent is extended or adjusted under 35 U.S.C. 154(b) by 597 days.

(21) Appl. No.: 10/609,601

(22) Filed: Jul. 1, 2003

(65) Prior Publication Data

US 2005/0001936 A1    Jan. 6, 2005

(51) Int. Cl.
*H04N 5/202* (2006.01)
*H04N 9/69* (2006.01)
*G09G 5/10* (2006.01)

(52) U.S. Cl. ............... 348/674; 348/254; 348/675; 345/690

(58) Field of Classification Search ........... 348/675, 348/254; 345/690; H04N 5/202
See application file for complete search history.

(56) References Cited

U.S. PATENT DOCUMENTS

| | | | | |
|---|---|---|---|---|
| 5,774,112 A | * | 6/1998 | Kasson | 345/601 |
| 5,949,496 A | * | 9/1999 | Kim | 348/645 |
| 6,304,300 B1 | * | 10/2001 | Warren et al. | 348/674 |
| 6,344,857 B1 | * | 2/2002 | Matono et al. | 345/600 |
| 6,720,969 B1 | * | 4/2004 | Lavelle et al. | 345/557 |
| 6,727,959 B1 | * | 4/2004 | Eskin | 348/674 |
| 6,900,747 B1 | * | 5/2005 | Lee | 341/106 |
| 6,944,336 B1 | * | 9/2005 | Chiu | 382/167 |
| 6,970,208 B1 | * | 11/2005 | Pether et al. | 348/674 |
| 7,038,735 B1 | * | 5/2006 | Coleman et al. | 348/674 |
| 7,046,255 B1 | * | 5/2006 | D'Souza et al. | 345/602 |
| 2002/0145678 A1 | * | 10/2002 | Suzuki et al. | 348/675 |

* cited by examiner

Primary Examiner—Brian P. Yenke
(74) Attorney, Agent, or Firm—Rabin & Berdo, P.C.

(57) ABSTRACT

This specification discloses a method of using locality statistics characteristic to enhance gamma corrections. Using the property that the color values of nearby digital image pixels are close to one another, the cache queue operation model is employed to partly replace the time-consuming table mechanism in the gamma correction procedure. The disclosed method first establishes a cache queue and then captures digital image pixels. According to the extracted digital image pixels, gamma correction values are searched to satisfy the cache queue. Finally, the gamma correction values corresponding to the digital image pixels are stored.

3 Claims, 2 Drawing Sheets

METHOD OF USING LOCALITY STATISTICS CHARACTERISTIC TO ENHANCE GAMMA CORRECTIONS

BACKGROUND OF THE INVENTION

1. Field of Invention

The invention relates to a gamma correction method for correcting digital images and, in particular, to a gamma correction method that employs the locality statistics characteristic.

2. Related Art

Gamma corrections pertain to the control and adjustment of colors in an image input/output (IO) system. It often relates to the control of the brightness in an image. If the output display of an image is not corrected in this way, the presented image often looks dim or the colors do not saturate because of the distortion occurring during signal transmissions. The procedure mainly adjusts the color output of the image by tuning the gamma values. A common method is to insert a step of checking a gamma table during the image IO process. Normally, a pixel is comprised of three subpixels representing the three primitive colors: red, green and blue. Therefore, the correction requires a red gamma table, a green gamma table, and a blue gamma table.

Taking a conventional gamma correction procedure as an example, at the same moment of inputting a digital image, the system separates the pixel into three subpixels of the three primitive colors and corrects them separately. After extracting the pixels in a digital image, the gamma tables of the respective colors are used to correct the colors. Each gamma table contains many sets of digital image subpixel values and the corresponding gamma correction values. When a digital image subpixel value is entered, the corresponding gamma correction value is obtained through a binary search. The gamma correction value is then stored in memory. This completes a table search correction procedure. However, it takes about 8 times of binary search clocks on the average to look for the corresponding gamma correction value for each subpixel. Therefore, each digital image pixel needs about 24 search clocks. This is very inefficient in practice.

SUMMARY OF THE INVENTION

In view of the foregoing, the invention provides a method that uses the locality statistics characteristic to enhance the gamma corrections. The invention employs a newly added cache queue to partially replace the original gamma tables. The cache queue is comprised of several digital image pixels and the corresponding gamma correction values extracted by the system in the beginning. Using the property that nearby digital image pixels have colors close to one another, the cache queue operation model is used to partially replace the time-consuming table searching mechanism in the gamma correction procedure. Thus, the invention achieves the objective of rapid searching in a table and can speed up the gamma corrections. The disclosed method first establishes a cache queue, extracts digital image pixels, and searches for gamma correction values for the digital image pixels. Finally, the gamma correction values corresponding to the extracted digital image pixels are stored to satisfy the cache queue.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
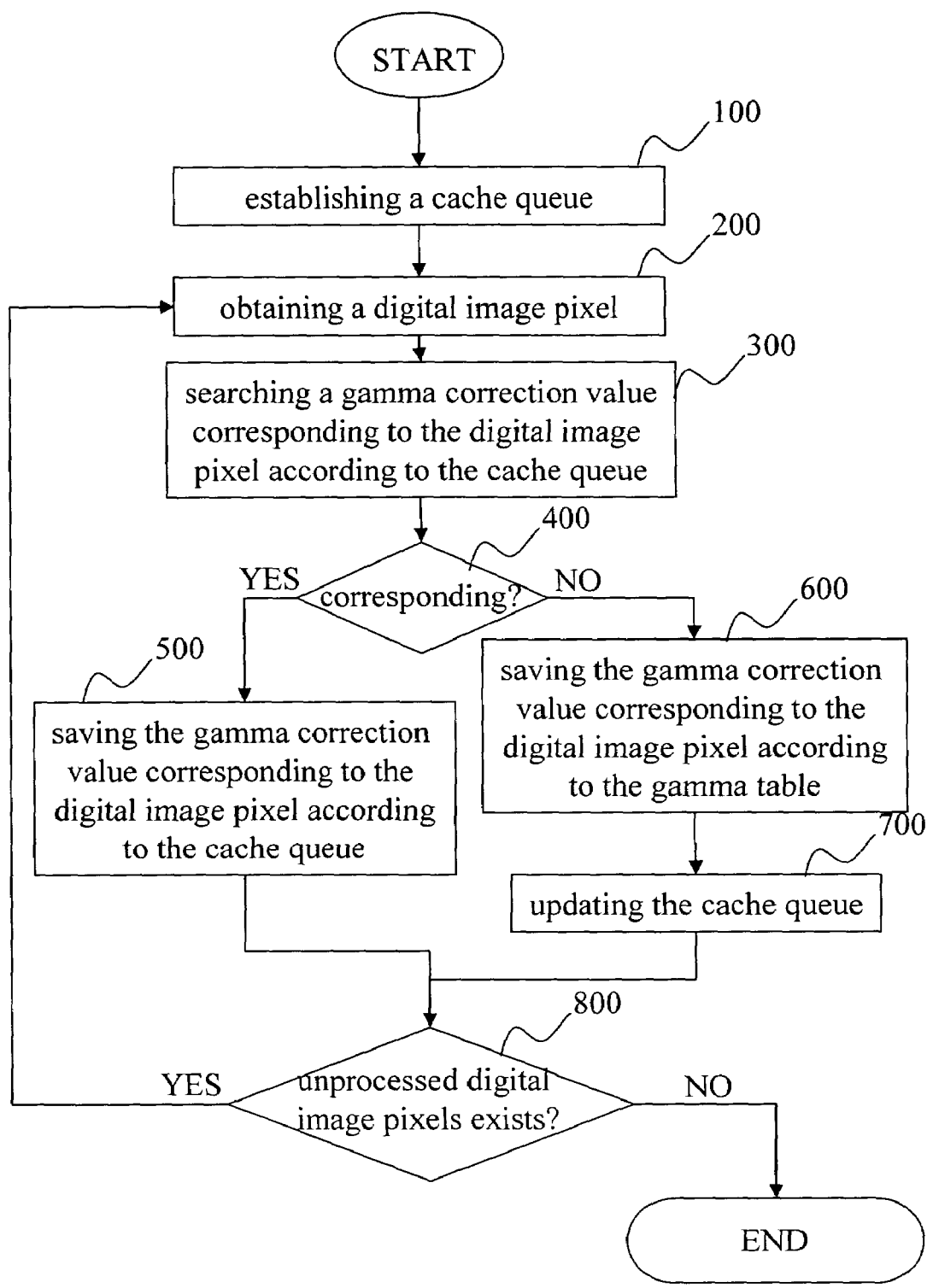
FIG. 1 is a flowchart of the disclosed gamma correction method using the locality statistics characteristic.
Figure 2:
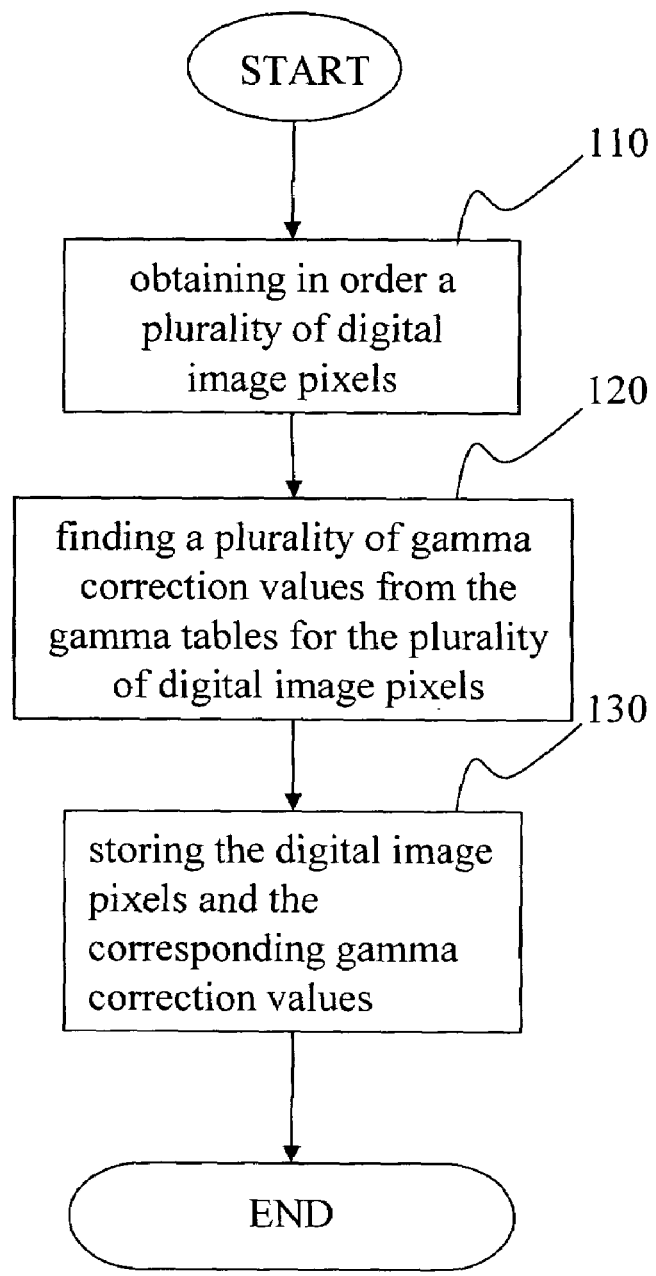
FIG. 2 is a flowchart of establishing a cache queue according to the invention.

Here we use an embodiment to illustrate the invention. The disclosed method uses the property that the color values of nearby digital image pixels are close to one another and the gamma tables in the original system memory. As shown in FIG. 1, the method starts by establishing a cache queue (step 100). That is, a cache queue is first formed in memory. The detailed steps are shown in FIG. 2. Several digital image pixels are received (step 110). The current example extract four sets of image pixels according to the three primitive colors to establish the cache queue. Therefore, each color has its own cache queue. Then the corresponding gamma correction values are obtained for the digital image subpixels in accordance with the gamma tables (step 120). The cache queues are completed from a conventional table searching procedure. Afterwards, the digital image pixels and the corresponding gamma correction values are stored (step 130) to form the cache queue. The function of the cache queue is to partially replace the gamma tables. Suppose the current cache queue setting is comprised of four sets of image subpixels and the corresponding gamma correction values (obtained by looking up the gamma tables). Since nearby pixels have similar colors, the gamma correction values for adjacent pixels can be rapidly found (only one search clock) from the cache queue. A digital image pixel is extracted in step 200 for corrections. The digital image pixel is used to search for the corresponding gamma correction values (step 300). When the gamma correction values are found from the cache queue, they are stored with the corresponding digital image pixels (step 400). This method replaces the conventional time-consuming table searching procedure while achieving the same correction effect. If corresponding gamma correction value can be found from the cache queue, the system saves the gamma correction value corresponding to the digital image pixel according to the cache queue (step 500). When unprocessed digital image pixels exists (step 800), the step will go on to obtain another digital image pixel (step 200). If no corresponding gamma correction value can be found from the cache queue, the system searches the gamma tables and stores the appropriate gamma correction values (step 600). In other words, the system returns to the original table search procedure for such digital image pixels. After the gamma correction values corresponding to the digital image pixels are found from the gamma tables, the system immediately updates its cache queue (step 700). At the moment, the updating is performed according to the first in first out (FIFO) principle to remove the first set of digital image pixels and the corresponding gamma correction values. The current digital image pixel and the corresponding gamma correction values obtained from the gamma tables are then stored in the cache queue. Also, when unprocessed digital image pixels exists (step 800), the step will go on to obtain another digital image pixel (step 200). Suppose the probability for the input digital image pixel to find the corresponding gamma correction values from the cache queue is about 80% on the average, then the time used in accord with the disclosed method can be computed as 24(searching clocks)*20%+1(searching clock)*80% while the conventional method requires

24(searching clocks)*100%

It is easily seen that the disclosed method is five times faster than the conventional one.

Certain variations would be apparent to those skilled in the art, which variations are considered within the spirit and scope of the claimed invention.

What is claimed is:

1. A method using locality statistics characteristic to enhance gamma corrections accomplished using gamma tables and the property that adjacent pixels have similar colors, the method comprising the steps of:
    establishing a cache queue having four digital image pixels and corresponding gamma correction values, comprising:
        obtaining in order a plurality of digital image pixels;
        finding a plurality of gamma correction values from the gamma tables for the plurality of digital image pixels; and
        storing the digital image pixels and the corresponding gamma correction values;
    extracting a digital image pixel;
    searching for gamma correction values corresponding to the digital image pixel satisfying the cache queue; and
    storing the gamma correction values for the digital image pixel according to the cache queue.

2. The method of claim 1, when the gamma correction values for the digital image pixel only exist in the gamma tables, further comprising the steps of:
    storing the gamma corrections values found from the gamma tables for he digital image pixels; and
    updating the cache queue.

3. The method of claim 2, wherein the step of updating the cache queue is performed according to the first in first out (FIFO) principle to remove the first set of digital image pixel and the corresponding gamma correction values from the cache queue and then to store the digital image pixel along with the corresponding gamma correction values found in the gamma tables.

* * * * *